United States Patent
Tiemann

(10) Patent No.: US 6,684,620 B2
(45) Date of Patent: Feb. 3, 2004

(54) COMBUSTION CHAMBER ARRANGEMENT FOR GAS TURBINES

(75) Inventor: Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/217,518

(22) Filed: Aug. 14, 2002

(65) Prior Publication Data

US 2003/0033794 A1 Feb. 20, 2003

(30) Foreign Application Priority Data

Aug. 14, 2001 (EP) .............................. 01119559

(51) Int. Cl.$^7$ ................................. F02C 3/00
(52) U.S. Cl. ........................ 60/39.37; 60/804
(58) Field of Search ................ 60/804, 39.37

(56) References Cited

U.S. PATENT DOCUMENTS

| | | | |
|---|---|---|---|
| 2,446,013 A | * 7/1948 | Kuyper | 60/39.094 |
| 2,702,454 A | 2/1955 | Brown | |
| 2,813,397 A | * 11/1957 | Fisher et al. | 60/800 |
| 3,086,363 A | * 4/1963 | Fiori | 60/39.37 |
| 3,657,882 A | * 4/1972 | Hugoson | 60/798 |
| 3,702,058 A | * 11/1972 | De Corso et al. | 60/757 |
| 4,573,315 A | * 3/1986 | Stroem | 60/39.37 |
| 4,719,748 A | 1/1988 | Davis, Jr. et al. | |
| 4,903,477 A | 2/1990 | Butt | |
| 6,192,669 B1 | * 2/2001 | Keller et al. | 60/804 |
| 6,374,594 B1 | * 4/2002 | Kraft et al. | 60/39.37 |
| 6,536,204 B2 | * 3/2003 | Lenz et al. | 60/39.37 |
| 2002/0157400 A1 | * 10/2002 | Schulten et al. | 60/772 |

FOREIGN PATENT DOCUMENTS

GB      980363      4/1962

OTHER PUBLICATIONS

The aircraft Gas Turbine Engine and its operation, P&W Oper. Instr. 200, United Technologies, Pratt & Whitney, Aug. 1988, Fig. 3–31, Can–Annular Combustion Chamber.*

* cited by examiner

*Primary Examiner*—Ehud Gartenberg
(74) *Attorney, Agent, or Firm*—Harness, Dickey & Pierce, P.L.C.

(57) ABSTRACT

A combustion chamber arrangement for gas turbines includes a multiplicity of individual combustion chambers which open out in a common annular combustion chamber and are arranged in the shape of a circle. The arrangement is such that it can be cooled highly efficiently using convective cooling, while also as far as possible dispensing with the use of impingement cooling. In such a combustion chamber arrangement, the annular combustion chamber, in the transition region to the individual combustion chambers, is of a height which fluctuates periodically and which is minimal in the region between adjacent individual combustion chambers.

22 Claims, 2 Drawing Sheets

COMBUSTION CHAMBER ARRANGEMENT FOR GAS TURBINES

The present application hereby claims priority under 35 U.S.C. §119 on European patent publication number EP 01119559.1 filed Aug. 14, 2001, the entire contents of which are hereby incorporated herein by reference.

FIELD OF THE INVENTION

The invention generally relates to a combustion chamber arrangement for gas turbines. Preferably, it relates to one which includes a multiplicity of individual combustion chambers which open out in a common annular combustion chamber and are arranged in the shape of a circle. The invention also generally relates to a gas turbine having a combustion chamber arrangement which is constructed in accordance with the invention.

BACKGROUND OF THE INVENTION

Gas turbines are in widespread use both in the field of power generation and as means for driving jet aircraft. In gas turbines, an air/fuel mixture is ignited in a combustion chamber, and the hot-gas stream resulting from the combustion is expanded into a turbine space, where the hot-gas stream comes into contact with an arrangement comprising guide vanes and turbine blades and sets the turbine blades arranged on a shaft and therefore the shaft itself in rotation. By way of example, a generator for generating power can now be operated with the aid of the rotary energy generated in this way.

Since the combustion of the air/fuel mixture results in high temperatures, which in modern, high-efficiency gas turbines may exceed temperatures of approximately 2000° C., the turbine has to be cooled in the region of the combustion chamber and in subsequent regions, in terms of flow, in order to avoid overheating and therefore destruction of the turbine material.

Various attempted solutions are known both with regard to the structure of the combustion chamber and with regard to the required cooling. With regard to the structure of the combustion chamber, it is firstly known to provide a continuous annular combustion chamber in the form of a closed annular space which opens out into a first turbine space via an annular gap. In the annular combustion chamber, the air/fuel mixture is ignited, and an annular hot-gas stream which passes through the gap into the turbine space, where it drives the turbine blades, is formed. A problem with a solution of this type, in addition to undesirable, noisy fluctuations in the combustion, is the spatial limits imposed on the annular combustion chamber. Since the annular combustion chamber is accommodated entirely in the turbine housing, the volume of the combustion chamber cannot be increased or can only be increased with considerable structural outlay. However, such an increase in the volume is desirable in order for advanced combustion concepts to be implemented.

An alternative possible configuration for the combustion chamber consists in a multipart solution. A plurality of individual combustion chambers (known as can combustion chambers) are arranged in the form of a circle around an annular space into which the individual combustion chambers open out. The annular space serves as downstream annular combustion chamber, so that the actual combustion takes place in two parts. An air/fuel mixture is introduced into each of the individual combustion chambers and is ignited in the individual combustion chamber. The combustion then begins in the individual combustion chamber and continues via a transition region into the annular combustion chamber. In the annular combustion chamber, the gas streams from the individual combustion chamber are combined to form an annular gas stream which in turn opens out into a turbine space in order to drive the turbine blades.

A design of this type has the advantage that the combustion of the air/fuel mixture can be initiated in the individual combustion chambers and can therefore be carried out and controlled in a locally restricted manner. Consequently, it is possible to reduce or avoid undesirable oscillations in combustion which are associated with undesirable evolution of noise. It is also possible for the individual combustion chambers to project through the actual turbine housing, so that the former can be configured independently of the turbine design and can be expanded virtually as desired. For example, the larger combustion chamber volumes which are required for new and innovative combustion concepts can be made available without the basic design concept of the turbines, in particular the turbine mounting in the turbine housing, having to be completely revised.

Modern gas turbines are generally cooled by use of a fluid stream, usually a cooling-air stream. In this case, fundamentally two different concepts are employed. These are firstly what is known as impingement cooling, in which a cooling-fluid stream is guided onto the surface which is to be cooled, impinges on this surface and thus contributes to cooling. A second concept is convective cooling, in which a cooling fluid absorbs the heat which is generated and dissipates it by convection. A drawback of impingement cooling is that a pressure gradient is required in order to generated the gas stream which impinges on the surface which is to be cooled. Since in modern gas turbines some of the rotary energy of the turbine shaft obtained by the turbine is used in order to compress the air required to produce the air/fuel mixture, and this air is often also used as a cooling fluid, there is a loss of turbine efficiency if a pressure drop is additionally to be produced for cooling purposes. For optimum combustion, incoming air which is under high pressure is favorable, and consequently any pressure loss reduces the efficiency of the combustion. However, for effective impingement cooling a high pressure loss is necessary in order to pass a corresponding air jet onto the surface which is to be cooled. Furthermore, in the case of high-efficiency combustion, as can be achieved with combustion air which is under high pressure, relatively high temperatures are produced, which leads to increased cooling requirements and therefore, when impingement cooling is used, requires a higher pressure drop.

The situation is different in the case of convective cooling, in which a high pressure drop is not required in order to produce air jets. This type of cooling is advantageous with regard to turbine efficiency, but with this mode of cooling there are difficulties with regard to the cooling efficiency. For example, with convective cooling it is necessary for the cooling fluid, for example the incoming combustion air used for subsequent combustion, to be able to flow onto the individual regions which are to be cooled without being impeded, in order to generate a sufficient cooling effect. With many combustion chamber constructions, this cannot be achieved for design reasons, and consequently impingement cooling, which attenuates turbine efficiency, is often used.

An example of the use of impingement cooling in a combustion chamber arrangement with individual combustion chambers which open out into an annular space is given by U.S. Pat. No. 4,719,748. In the impingement cooling device described in this document, a transition region between the individual combustion chambers and a turbine stage of a gas turbine is surrounded by an impingement sleeve. An intermediate volume is formed between the impingement sleeve and the wall of the transition region, and the impingement sleeve has a multiplicity of openings. Cooling gases flow through these openings toward the wall of the transition piece, impinge on this wall and are thus responsible for cooling. A cooling concept of this type requires a high pressure drop between the outer side of the impingement sleeve and the interior volume, in order to allow jets of the cooling air to flow onto the surface of the wall of the transition region and provide the impingement for cooling at that location. As has been explained above, this pressure loss reduces the efficiency of the turbine.

SUMMARY OF THE INVENTION

An embodiment of the invention includes an object of further developing a combustion chamber arrangement in such a manner that it can be cooled using highly efficient convective cooling, with the use of impingement cooling being dispensed with as far as possible.

To achieve this object, an embodiment of the invention proposes that, in a combustion chamber arrangement, the annular combustion chamber, in a transition region to the individual combustion chambers, has a height which fluctuates periodically and is minimal in the region between adjacent individual combustion chambers.

Designing the annular combustion chamber in this manner allows a substantially more rectilinear flow guidance of the hot gas to be achieved, with a favorable transition from the individual combustion chambers into the downstream annular combustion chamber resulting. Moreover, designing the transition region between annular combustion chamber and individual combustion chambers in this way also allows favorable flow of a cooling fluid used for convective cooling onto the outer side.

To design the transition region between individual combustion chambers and annular combustion chamber in accordance with an embodiment of the invention, walls which delimit the annular combustion chamber are preferably designed in wavy form. In this case, the walls of the annular combustion chamber are arranged in such a way that openings of a maximum height and a minimum height alternately result in the transition region.

Further smoothing and gentle diversion of the hot-gas stream result if the annular combustion chamber, starting from the transition region which is formed with a periodically fluctuating height toward a turbine space connected downstream of the combustion chamber arrangement, in terms of flow, merges continuously into an annular space with a height which is uniform in the circumferential direction. In this way, the hot-gas streams which enter the annular combustion chamber from the individual combustion chambers in the transition region are distributed uniformly and are homogenized to form a single, annular gas stream. The continuous transition allows a pressure loss in the interior of the combustion chamber arrangement to be kept at a low level, which allows a high turbine efficiency to be achieved.

To be able to achieve targeted convection cooling, according to a further advantageous refinement of the invention, it is proposed that the housings of the combustion chamber arrangement be designed in the form of two shells. A gap space is preferably left between an inner shell and an outer shell and the shape of the outer shell is preferably matched to the shape of the inner shell in such a way that the distance between the two housing shells is substantially constant. With a two-shell structure of the housing of this type, it is possible to achieve good guidance of the cooling fluid used for convective cooling, the shape of inner shell and outer shell meaning that the cooling fluid which is guided in the gap space for cooling purposes reaches all the regions which are to be cooled uniformly, thus ensuring optimum cooling. On account of the shape of the inner shell and the outer shell of the housing, in the transition region between the annular combustion chamber and the individual combustion chambers, the gap space is transferred uniformly into individual gap spaces which surround the individual combustion chambers from a double ring which extends on both sides of the annular combustion chamber. This transfer takes place continuously and in gradual transitions, so that a gentle conversion of the cooling fluid flow without major pressure losses is possible. The avoidance of pressure losses at this point too contributes to the desired high turbine efficiency.

In a preferred configuration of the annular combustion chamber arrangement, finally, the individual combustion chambers are circular in cross section and are preferably designed in the form of a cylinder. A cross-sectional shape of the individual combustion chambers of this type on the one hand represents a suitable geometry for high-efficiency combustion, and on the other hand allows a smooth transition of the hot-gas flow from the individual combustion chambers formed in this way into the annular combustion chamber using the transition region described above.

Finally, an embodiment of the invention provides a novel gas turbine in which a combustion chamber arrangement as described above is used.

BRIEF DESCRIPTION OF THE DRAWINGS

Further advantages and features of the invention will emerge from the following description of an exemplary embodiment with reference to the appended drawings, in which.

In the figures, identical elements are provided with identical reference symbols.

DETAILED DESCRIPTION OF THE PREFERRED EMBODIMENTS

Figure 1:
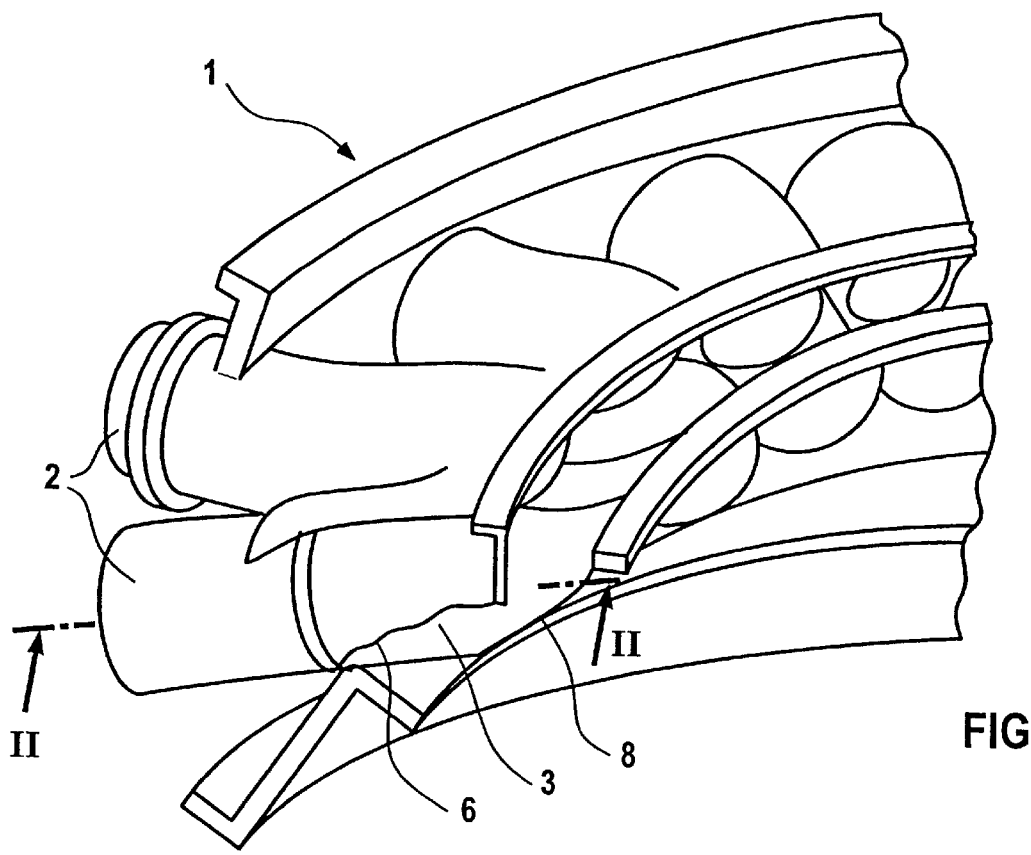
FIG. 1 shows a perspective, partially sectional view of a combustion chamber arrangement according to an embodiment of the invention with a wavy transition region between individual combustion chambers and annular combustion chamber.

FIG. 1 shows a perspective view, partially in section, of a combustion chamber arrangement 1 according to the invention. A multiplicity of individual combustion chambers 2, which are arranged substantially in the shape of a circle and are of cylindrical design, open out into a common annular combustion chamber 3. The annular combustion chamber 3 has a two-shell housing with an outer shell 8 and an inner shell 6. The housings of the individual combustion chambers are also of two-shell structure, with a corresponding inner shell 5 and an outer shell 7 (cf. FIG. 2). For operation of a gas turbine which is equipped with the combustion chamber arrangement 1 according to an embodiment of the invention, an air/fuel mixture is introduced into each of the individual combustion chambers 2, where it is ignited. In a first stage, the combustion then takes place in the individual combustion chambers 2, but then it also continues into the common annular combustion chamber 3.

The hot gas formed during the combustion is expanded and starting from the individual combustion chambers 2 spreads into the annular combustion chamber 3 and then passes onward, through a gap left on the outlet side of the annular combustion chamber 3, toward a turbine space 4 (cf. FIG. 2), where it transfers mechanical energy to a turbine shaft.

A transition region between the individual combustion chambers 2 and the common annular combustion chamber 3 is of wavy design. Both the inner shell 6 and the outer shell 8 of the annular combustion chamber housing are of wavy shape. In the direction of the turbine space, the wavy formation of the transition region merges into an annular space of constant height. This geometry allows a uniform transition from the individual combustion chambers 2 into the annular combustion chamber 3 and finally into the turbine space 4 (cf. FIG. 2). In this way, it is possible to achieve a highly uniform flow out of the combustion chamber arrangement 1 into the turbine space 4, allowing efficient operation of the turbine. In particular, in this way it is possible to prevent hot gas from entering the turbine space in concentrated form at certain points, which would lead to undesirable temperature peaks at these locations in the turbine space. Therefore, enhanced cooling of the blades located in the turbine space is not required.

Figure 2:
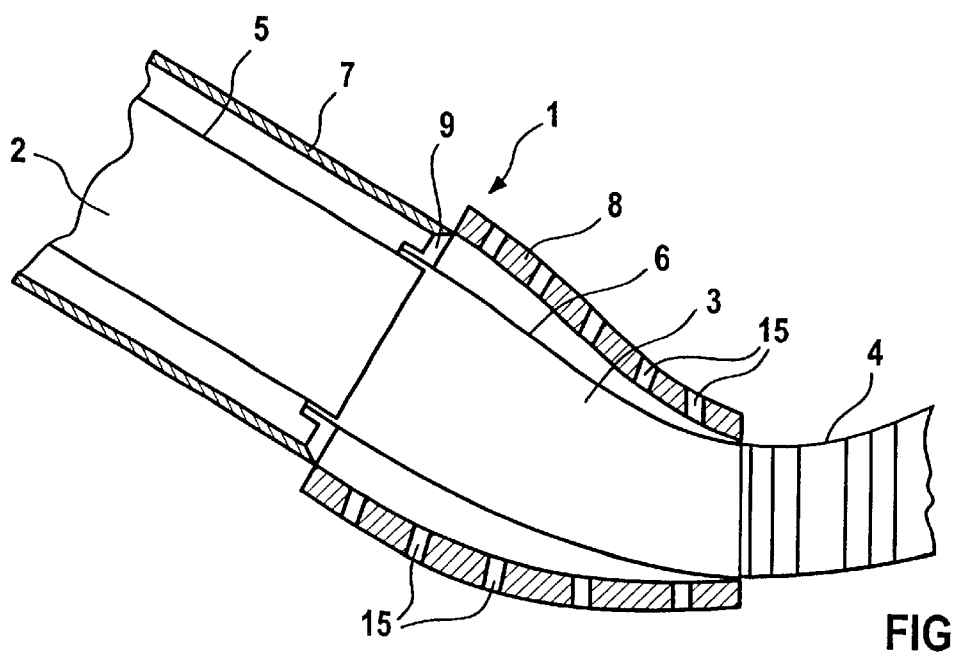
FIG. 2 shows a sectional view through a combustion chamber arrangement according to an embodiment of the invention on section line II—II from FIG. 1, this figure illustrating further parts which are flanged onto the combustion chamber arrangement.

The two-shell structure of the housing of the combustion chamber arrangement 1 is readily apparent from FIG. 2, which illustrates a section through the combustion chamber arrangement 1 in a sectional illustration corresponding to section line II—II in FIG. 1. In this illustration, the combustion chamber arrangement 1 is integrated in a gas turbine. This figure once again illustrates the individual combustion chambers 2, the annular combustion chamber 3, and also a turbine space 4 connected downstream of the annular combustion chamber 3, in terms of flow. The annular combustion chamber 3 and individual combustion chambers 2 are of two-part design and are flanged to one another. Both the annular combustion chamber 3 and the individual combustion chambers 2 each have housings which are of two-shell structure, with an inner shell 6 or 5, respectively, and an outer shell 8 or 7, respectively. A gap space 9 is left between the inner shells 5, 6 and the outer shells 7, 8. The gap space 9 is used for passage of a cooling fluid which enters through openings 15 in the outer shell 8 of the annular combustion chamber 3. In the present exemplary embodiment, the cooling fluid used is the air which is used for the subsequent combustion. This air enters the gap space 9 through the openings 15 and flows along the inner shells 6 or 5 of the annular combustion chamber 3 or the individual combustion chambers 2, respectively. The flowing air is responsible for convection cooling of the combustion-chamber inner shell 5, 6 and ultimately passes in preheated form into the individual combustion chambers 2.

The wavy design of both inner shell 6 and outer shell 8 of the annular combustion chamber 3 in the transition region to the individual combustion chambers 2 results in the air used for convection cooling being passed gently from a doubling-ring configuration, via a strut-connected double ring, into a large number of small rings in the region of the individual combustion chambers 2, without any steps or edges which are disadvantageous in terms of flow being produced. The geometric configuration of the inner shell 6 and of the outer shell 8 and therefore of the gap space 9 in the transition region from the annular combustion chamber 3 to the individual combustion chambers 2 brings the convectively cooling flow uniformly onto all the hot surfaces which are to be cooled, so that the convective cooling action is maximized. Impingement cooling which maximizes the pressure loss and therefore reduces turbine efficiency can therefore be kept at a minimum level.

Figure 3:
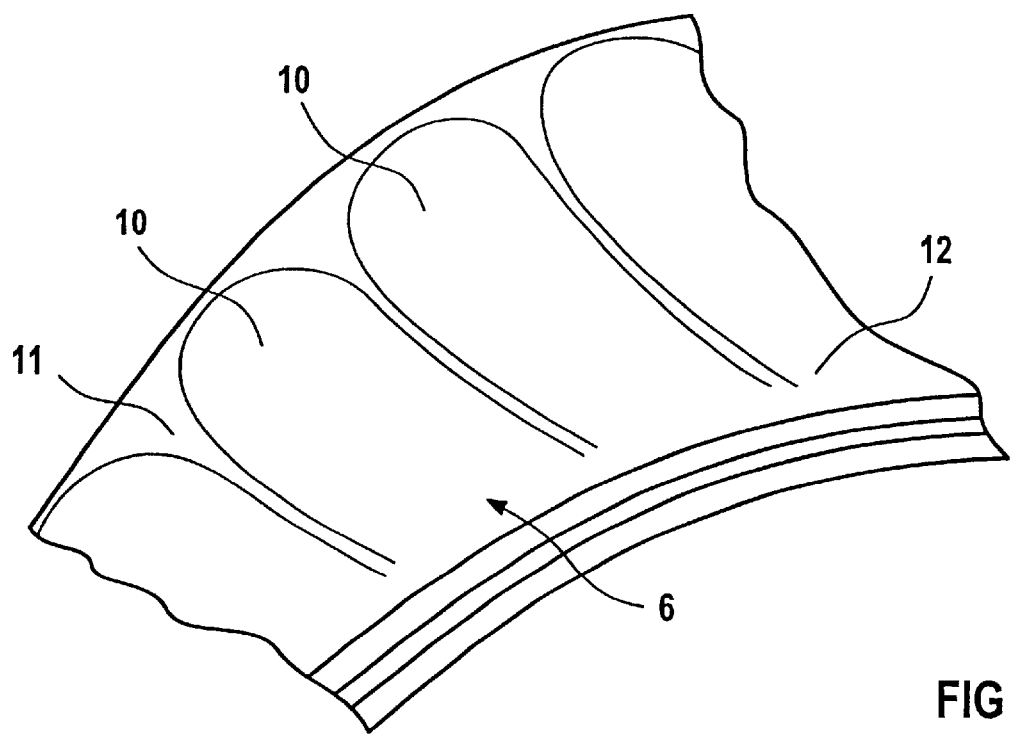
FIG. 3 shows a perspective illustration of part of a housing inner shell of the annular combustion chamber of the combustion chamber arrangement according to an embodiment of the invention.
Figure 4:
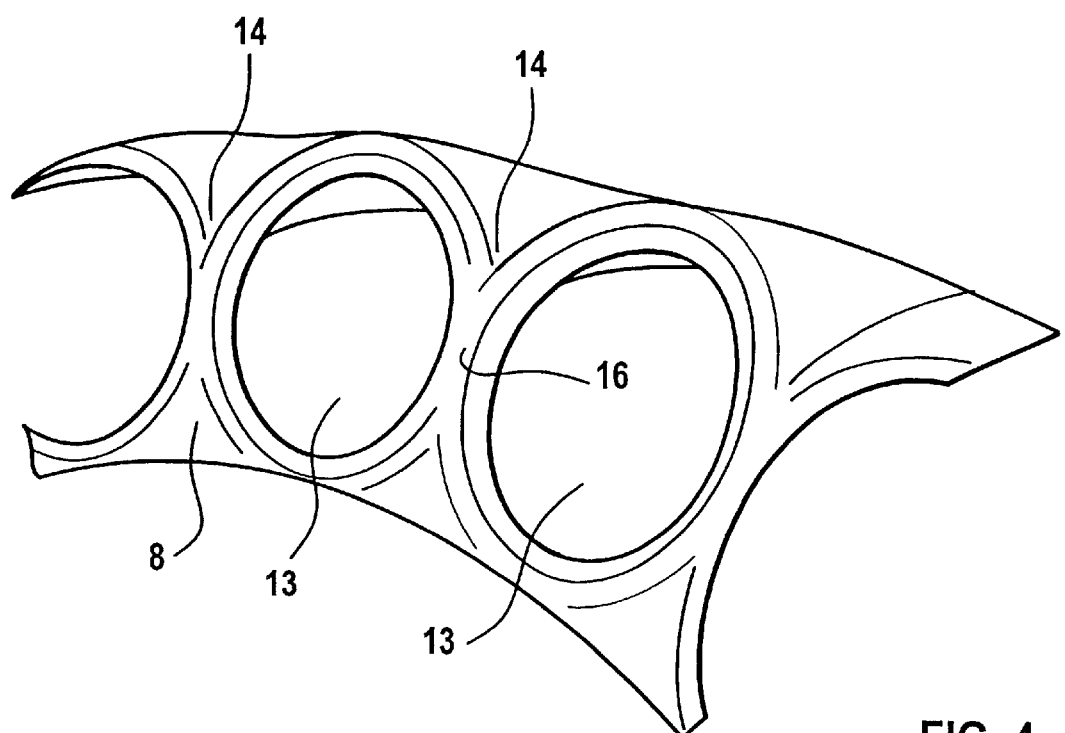
FIG. 4 shows a perspective illustration of part of the outer shell of the annular combustion chamber of the combustion chamber arrangement according to an embodiment of the invention.

FIGS. 3 and 4 each show a perspective view of part of the structure of the inner shell 6 and of the outer shell 8, respectively, of the annular combustion chamber 3. It can be seen that, in the transition region to the annular combustion chambers, the inner shell alternately has recesses 10 and webs 11, the shape of the recesses 10 being matched to the shape of the inner shell 5 of the individual combustion chambers 2. The webs 11 stand between the individual combustion chambers. The recesses 10 run out gently to an end 12 located in the direction of the turbine space, becoming flatter and narrower and ultimately opening out into a region of uniform height. This region of uniform height forms the outlet annular gap which faces in the direction of a turbine space.

In the perspective illustration of a section of the outer shell 8 of the annular combustion chamber in FIG. 4, it is possible to recognize circular openings 13, which are arranged lying adjacent to one another on an arc of a circle, for connection of the cylindrically shaped individual combustion chambers 2. Between the openings 13 it is possible to see constrictions 14 which open out into a narrow web 16 which has been left between the openings 13. When the combustion chamber arrangement is assembled, the constrictions 14 lie in the region of the webs 11. Therefore, in the transition region from the annular combustion chamber 3 to the individual combustion chambers 2, inner shell 6 and outer shell 8 form a similar wavy surface, leaving a gap space which is likewise of wavy design and, in the region of the opening 13, merges into individual annular gaps which surround the individual combustion chambers 2.

The annular combustion chamber arrangement according to an embodiment of the invention results firstly in homogeneous and uniform hot-gas flow guidance from the individual combustion chambers via the annular combustion chamber into the turbine space. Secondly, on account of the likewise uniform, gentle flow guidance of the cooling flow, results in the maximum efficiency of convection cooling of the hot surface of the combustion chamber arrangement which is to be cooled. This allows impingement cooling, which maximizes the pressure loss and therefore reduces the turbine efficiency, to be minimized. In addition to the novel combustion chamber arrangement, an embodiment of the invention also relates to a gas turbine which makes use of this combustion chamber arrangement.

List of Reference Symbols
1 Combustion chamber arrangement
2 Individual combustion chamber
3 Annular combustion chamber
4 Turbine space
5 Inner shell
6 Inner shell
7 Outer shell 8 Outer shell
9 Gap space
10 Recess
11 Web
12 End
13 Connection opening
14 Constriction
15 Opening
16 Web The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A combustion chamber arrangement for gas turbines, comprising:
 a plurality of individual combustion chambers, opening out in a common annular combustion chamber and arranged substantially in the shape of a circle, wherein the annular combustion chamber, in a transition region to the individual combustion chambers, is of a height which fluctuates periodically and which is minimal in regions between adjacent individual combustion chambers.

2. The combustion chamber arrangement as claimed in claim 1, wherein a wall of the annular combustion chamber, in the transition region to the individual combustion chambers, is designed in wavy form in the circumferential direction of the annular combustion chamber.

3. The combustion chamber arrangement as claimed in claim 1, wherein the shape of the interior of the annular combustion chamber, starting from the transition region toward a turbine space which is downstream of the annular combustion chamber in terms of flow, merges continuously into an annular space with a height which is uniform in the circumferential direction.

4. The combustion chamber arrangement as claimed in claim 1, wherein a housing of the combustion chamber arrangement is of two-shell structure, including an inner shell and an outer shell, the inner shell and outer shell being arranged at a distance from one another under the load of a gap space, and the inner shell and outer shell running substantially parallel to one another, maintaining a substantially constant distance from one another.

5. The combustion chamber arrangement as claimed in claim 1, wherein the individual combustion chambers include circular cross sections.

6. The combustion chamber arrangement as claimed in claim 5, wherein the individual combustion chambers are of cylindrical shape.

7. A gas turbine, comprising the combustion chamber arrangement as claimed in claim 1.

8. The combustion chamber arrangement as claimed in claim 2, wherein the shape of the interior of the annular combustion chamber, starting from the transition region toward a turbine space which is downstream of the annular combustion chamber in terms of flow, merges continuously into an annular space with a height which is uniform in the circumferential direction.

9. The combustion chamber arrangement as claimed in claim 2, wherein a housing of the combustion chamber arrangement is of two-shell structure, including an inner shell and an outer shell, the inner shell and outer shell being arranged at a distance from one another under the load of a gap space, and the inner shell and outer shell running substantially parallel to one another, maintaining a substantially constant distance from one another.

10. The combustion chamber arrangement as claimed in claim 3, wherein a housing of the combustion chamber arrangement is of two-shell structure, including an inner shell and an outer shell, the inner shell and outer shell being arranged at a distance from one another under the load of a gap space, and the inner shell and outer shell running substantially parallel to one another, maintaining a substantially constant distance from one another.

11. The combustion chamber arrangement as claimed in claim 8, wherein a housing of the combustion chamber arrangement is of two-shell structure, including an inner shell and an outer shell, the inner shell and outer shell being arranged at a distance from one another under the load of a gap space, and the inner shell and outer shell running substantially parallel to one another, maintaining a substantially constant distance from one another.

12. The combustion chamber arrangement as claimed in claim 2, wherein the individual combustion chambers include circular cross sections.

13. The combustion chamber arrangement as claimed in claim 12, wherein the individual combustion chambers are of cylindrical shape.

14. The combustion chamber arrangement as claimed in claim 3, wherein the individual combustion chambers include circular cross sections.

15. The combustion chamber arrangement as claimed in claim 14, wherein the individual combustion chambers are of cylindrical shape.

16. The combustion chamber arrangement as claimed in claim 4, wherein the individual combustion chambers include circular cross sections.

17. The combustion chamber arrangement as claimed in claim 16, wherein the individual combustion chambers are of cylindrical shape.

18. A gas turbine, comprising the combustion chamber arrangement as claimed in claim 2.

19. A gas turbine, comprising the combustion chamber arrangement as claimed in claim 3.

20. A gas turbine, comprising the combustion chamber arrangement as claimed in claim 4.

21. A gas turbine, comprising the combustion chamber arrangement as claimed in claim 5.

22. A gas turbine, comprising the combustion chamber arrangement as claimed in claim 6.

* * * * *